3,331,672
METHOD AND APPARATUS FOR DRAWING
GLASS STRIPS OFF OF A MOLTEN METAL
BATH
Gustave Javaux, Saint-Gilles, Belgium, assignor to
Glaverbel, Brussels, Belgium
Filed Oct. 15, 1963, Ser. No. 316,334
Claims priority, application Luxembourg, Oct. 16, 1962,
42,543
8 Claims. (Cl. 65—65)

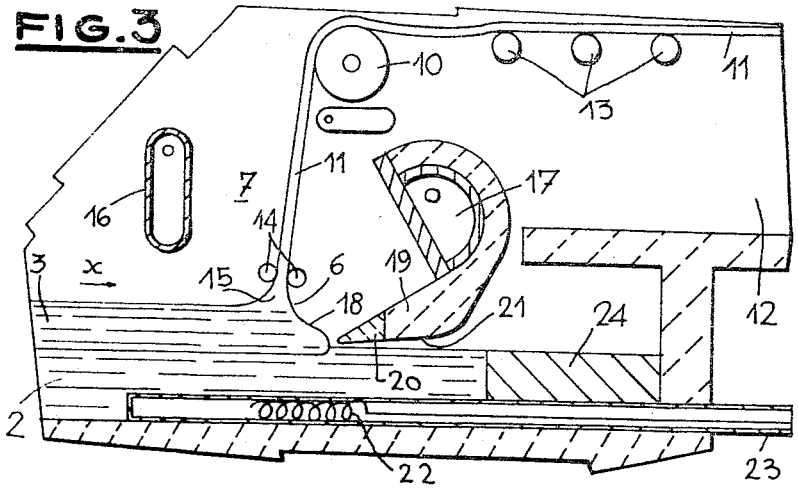
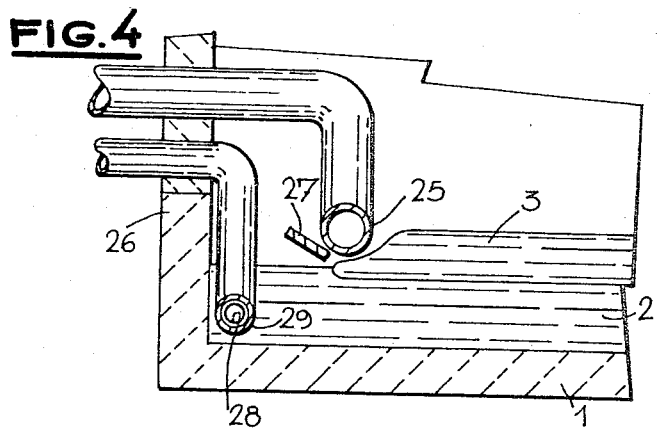
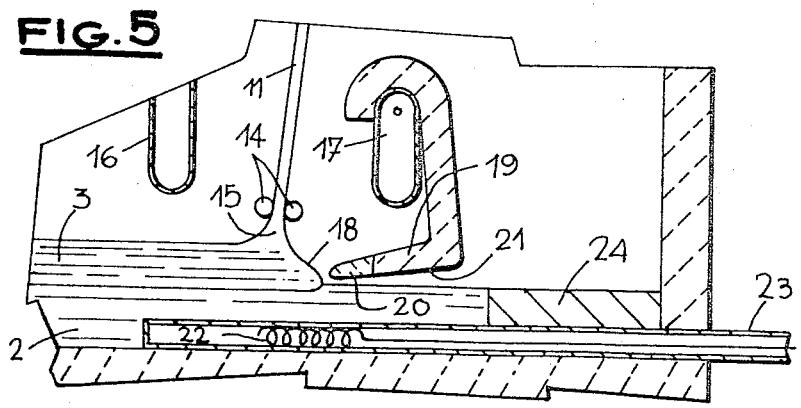

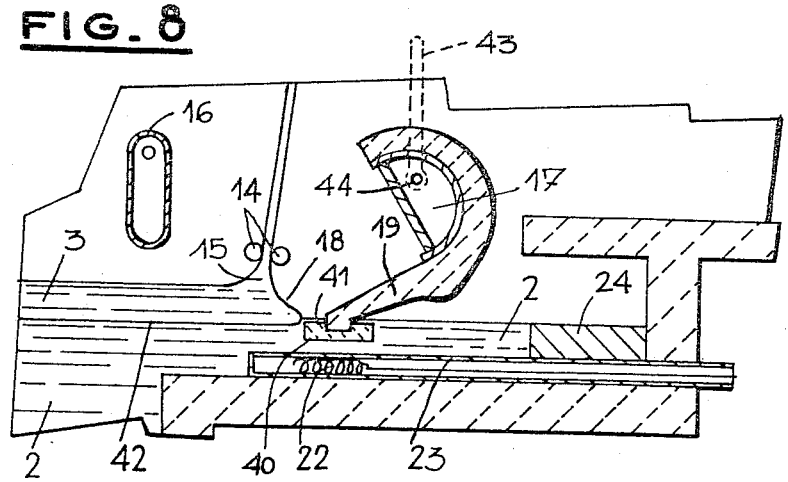
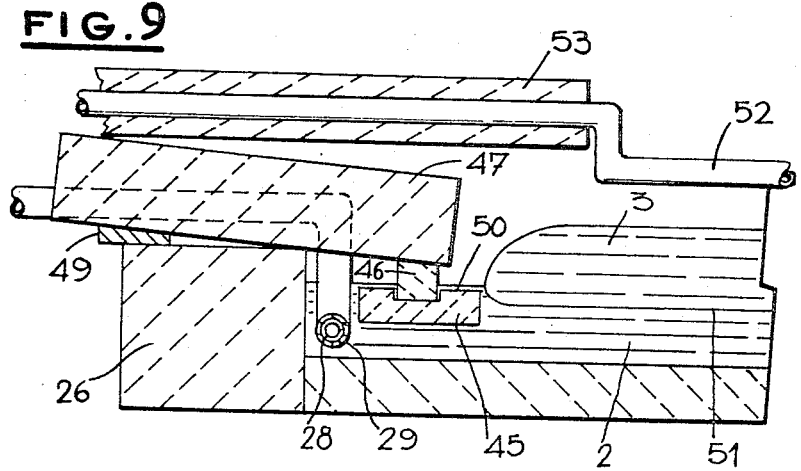

This invention relates to methods and apparatus for drawing a glass strip from the surface of a layer of glass in a plastic state.

The glass layer is moved to a drawing zone by being slidingly advanced on a batch of melted material at which zone the two surfaces of the strip are cooled to enable the strip to be drawn from the layer of glass.

It is known to draw a glass strip from a mass of melted glass supported on a bath of molten material.

The bath acts as a lubricant between the melted glass and the bottom of the tank in which the mass of melted glass is located. The tank is usually constructed of refractory material.

In the known process the mass of molten glass extends over the whole surface of the bath and comes into contact with all the walls of the tank. The molten glass stagnates on contact with the walls of refractory material and is easily devitrified, causing interruptions in production to remove or remelt the devitrified material.

It is also known to feed the mass of glass to be drawn forward on the bath, the latter being circulated beneath the mass of glass to make its temperature uniform. This process however involves the same disadvantage of devitrification.

It is also known to float a strip of glass in a plastic state on a bath of molten metal wider than the strip.

The strip is then removed from the bath of molten metal while preferably undergoing a drawing process.

In this latter case it is difficult to cool the glass strip energetically in order to enable drawing the same without also cooling in the bath of metal and causing it to congeal if its melting point is rather high, as is the case for instance with baths of silver and gold. There is a risk therefore of the glass strip adhering to the congealed metal.

It is an object of the invention to draw the strip from the glass layer without devitrification of the latter and without congealing of the bath.

It is another object of the invention to cool the strip while substantially insulating the bath to prevent congealing of the latter.

It is still a further object of the invention to prevent the glass sheet from contacting the walls of the tank.

In accordance with the invention, the flow of the layer of glass in the plastic state on the bath of molten material beyond the foot where the strip is drawn is prevented by cooling its front surface to a sufficient degree for this layer, because of the increasing viscosity of the end surface which forms the free flow front of the sheet of glass, to be continuously entrained without stagnating, to form the front surface of the strip.

By stopping the flow of the layer of glass near the foot of the strip it becomes possible to avoid the glass stagnating on contact with the refractory wall located at the end of the drawing compartment opposite that to which the layer of glass enters this compartment. The terminal surface constituting the free flow front of the layer of glass is drawn continuously with the glass at the foot of the strip in such a way that the glass of this terminal surface is constantly renewed, which also assists to prevent its devitrification.

This process, avoiding the devitrification of the glass by stagnation and adhesion to the refractory material, makes it possible to use more economical glass compositions than those used in conventional drawing processes; compositions, for instance, in which part of the soda and/or alumina is replaced by lime.

The maximum speed of congelation of glass with a high content of lime, with short working stages, that is to say with a larger increase in viscosity for a given fall in temperature, allows the drawing speed to be considerably increased without having to fear devitrification of the glass.

In carrying out the process in accordance with the invention it is advantageous to reduce as much as possible the cooling of the bath of molten material near the foot of the strip, because any film of solidifying molten material would stick to the glass and would be entrained by the strip.

With this in mind a screen may be interposed between the means for cooling the foot of the strip and the bath exposed beyond the said foot. Alternatively the bath beyond the foot of the strip may be heated to prevent congealing or the said screen and heating may be employed simultaneously.

To avoid the sticking, stagnation and devitrification of the glass along the walls of the drawing tank which extend parallel to the direction of feed of the layer of glass, the inner surface of these walls may be covered with carbon plates, or plates of boron nitride or any other material over which the glass will slide on contact without sticking.

It is however also possible, in accordance with the invention, to cool the longitudinal edges of the layer of plastic glass sufficiently to prevent the layer from spreading laterally over the whole width of the bath of molten material.

This precaution is particularly desirable when the molten material is a bath of silver, on which the glass spreads much more easily than on a bath of some other metal such as tin, even when the temperature of a bath of tin is the same as that of the bath of silver.

The invention also contemplates apparatus comprising a drawing tank in which a layer of plastic glass is continuously fed to said tank and moves towards a drawing zone by floating on a bath of molten material, means for drawing a strip of glass from this layer and cooling means for cooling the opposite two surfaces of the foot of the strip during the drawing process.

The apparatus is characterized in that it further comprises, between the cooling means cooling the front surface of the foot of the strip and the part of the bath of molten material under this cooling means, a heat insulative screen which protects this part of the molten material from the influence of said cooling means.

In a preferred embodiment the above mentioned screen is placed sufficiently near the bath of molten material to form a barrier opposing the flow of the glass in case the cooling is accidentally disturbed and the layer of glass continues to flow.

It is also advantageously to provide electrical heating resistors below the foot of the strip in sheaths immersed in the bath of molten material.

In order to make sure that the glass layer is not slowed down by the longitudinal walls of the drawing tank, so as to adhere to the walls and be devitrified by stagnation there it is arranged longitudinal cooling means above the edges of the glass layer at a distance from the longitudinal walls of the drawing tank. This prevents the glass being drawn from spreading laterally against these walls.

Specific embodiments of the invention will now be described by way of example with reference to the accompanying drawings in which:

FIGURE 3 represents a part of FIGURE 1 on a larger scale,

Figure 1:
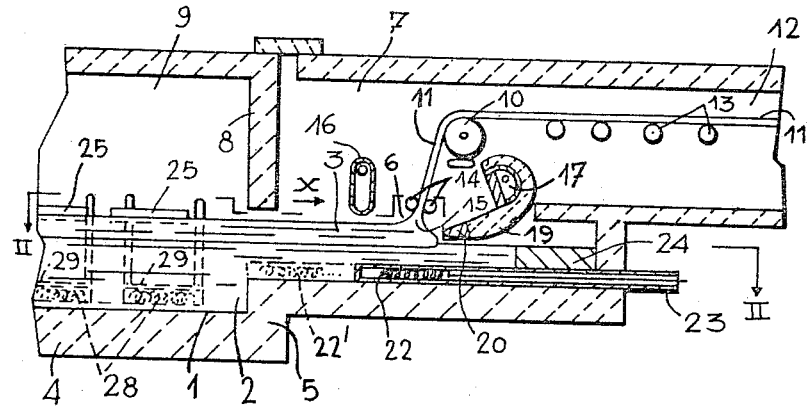
FIGURE 1 is a vertical section along the line I—I in FIGURE 2.
Figure 2:
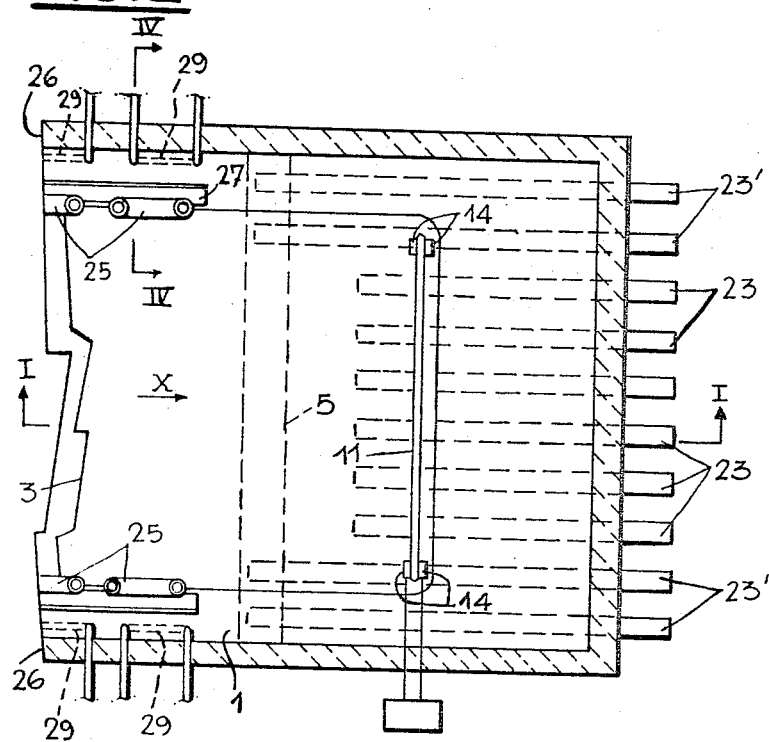
FIGURE 2 is a plan view in section along the broken line II—II in FIGURE 1.
Figure 6:
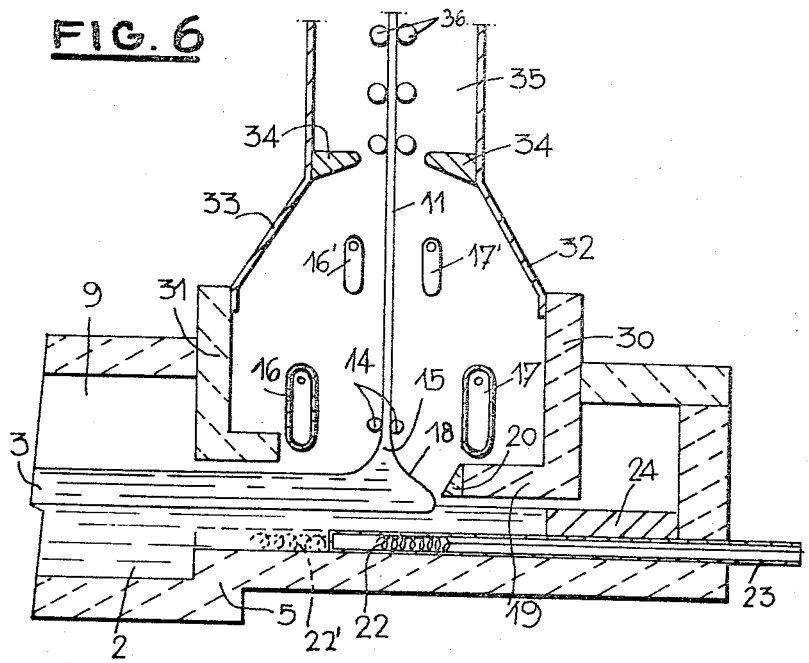
Figure 7:
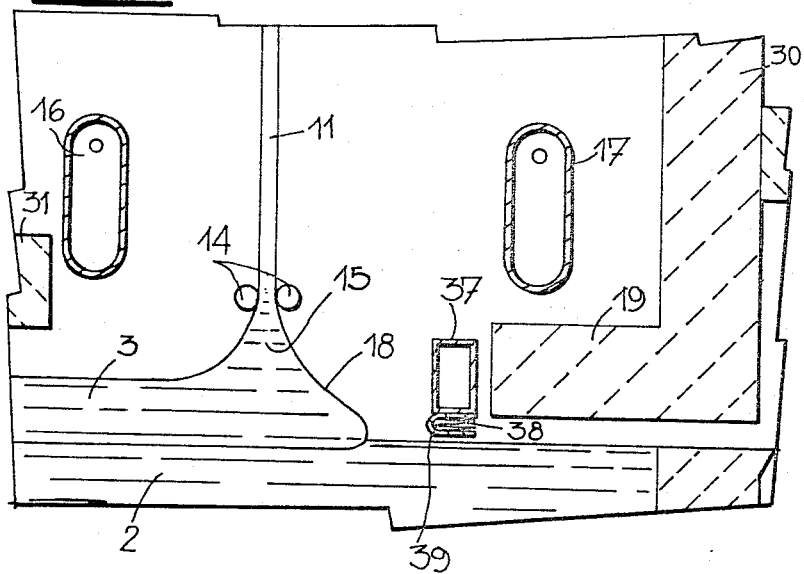

FIGURE 4 is a cross-section on a larger scale of the apparatus along the line IV—IV shown in FIGURE 2, FIGURE 5 is a cross-section of a further embodiment of the heat screen of the apparatus shown in FIGURE 1, FIGURE 6 is a vertical section similar to that in FIGURE 1 of a second form of embodiment of the apparatus in accordance with the invention, FIGURE 7 is a cross-section of the embodiment of the screen represented in FIGURE 6, FIGURE 8 is a section similar to that shown in FIGURE 1 in a third type of apparatus in accordance with the invention, FIGURE 9 is a cross-section similar to that in FIGURE 4 of a fourth type of apparatus in accordance with the invention.

In these various figures the same reference numerals designate identical elements.

The apparatus shown in FIGURES 1 to 4 comprises a drawing tank 1 containing a bath of molten material 2 denser than glass and substantially unreactive with a layer of plastic glass 3 which is floating thereon. The bath 2 consists, for instance, of a metal, preferably a metal not oxidizable at the temperature at which the glass is treated. Preferably, a bath of silver is used.

The sole 4 of the drawing tank 1 has a step 5 on the right of which the glass floating on the bath 2 moving forward in the direction of the arrow X is drawn upwards at a point such as 6. This forms part of a drawing chamber or compartment 7 which is separated by a partition 8 from the enclosure 9 situated to the left of this partition. The partition 8 extends downwardly to the vicinity of the level of the glass layer 3 in order to reduce the currents of air in the drawing chamber 7. In the drawing chamber 7 there is provided a drawing roll 10 which acts simultaneously as a folding roller for the glass strip 11 which then moves forward in a lehr 12, being carried by rollers 13.

The drawing chamber also contains marginal grippers 14 which are arranged slightly above the foot 15 of the strip and which prevent any exaggerated shrinkage of the strip during formation.

The foot 15 of the strip is cooled on its two opposite surfaces by cooling members 16 and 17. The cooling member 17, that is to say the member cooling the front surface of the foot of the strip from the point of view of the forward feed of the glass layer towards the drawing point 6 sufficiently cools the terminal surface 18 forming the free flow front of this layer to prevent it from progressing beyond the foot 15 on the molten silver bath 2. This cooling is sufficient for the said layer, as a result of the increase in viscosity of the terminal surface which forms the free flow front of the layer of glass, to be continuously entrained, without stagnation, to form the front surface of the strip.

In order not to congeal the both of molten material 2 in the vicinity of the foot 15 of the strip in spite of the comparatively intensive cooling of the terminal surface, particularly when the bath of molten material is a metal with a comparatively high melting point, such as gold or silver, there is provided a heat screen 19 between the cooling member 17 and the part of the bath 2 near the foot of the strip which is not covered by this latter.

This screen is preferably arranged sufficiently near the bath 2 to form a barrier opposing the flow of glass in the case where, for some reason independent of the operator, the cooling of the film 18 becomes insufficient to prevent the forward movement of the layer of glass towards the drawing point.

The end 20 of the screen 19 which is near the foot 15 of the strip 11 is preferably made of a material such as carbon or boron nitride to which glass does not adhere, in order that the free front of the layer of glass which might contact this end because of insufficient cooling shall not remain adherent to the screen 19 when normal conditions of operation are resumed.

The screen 19 preferably has a surface 21 facing the bath of molten material, which is polished and is reflective in order to reduce the exchange of heat between this screen and the bath 2.

The apparatus in FIGURES 1 to 4 further comprises electrical heating resistors 22 in sheaths 23 immersed in the bath of molten material 2. These resistors are placed under the foot of the strip and are provided in order to avoid congelation of the bath 2 under the said foot. The resistors 22 can be moved in the sheaths 23 parallel to the forward feed direction of the glass so that their position can be adjusted in the vicinity of the foot 15 of the strip to furnish a more intense heating to the bath 2 where it is so required.

The sheaths 23 may be constituted, for instance of tungsten and extend parallel to the feed direction of the glass. They traverse a congealed part 24 of the same material as that constituting the bath 2 on which the glass moves forward towards the drawing point. The strength of the current passing through the resistors 22 can be controlled.

It can also be seen from FIGURES 1, 2 and 4 that the apparatus comprises longitudinal cooling members 25 placed below the edges of the layer of glass 3 at a distance from the longitudinal walls 26 of the drawing tank. It is thus possible to keep the edges of the layer sufficiently cool to prevent this layer from spreading laterally against the said walls, even when the bath of molten material 2 is of silver. Cooling members of this kind are of course provided on the part of the apparatus which does not form part of the invention and which serves to feed the drawing tank continuously with plastic glass.

The cooling of the lateral zones of the bath 2 which are not covered with the sheet of glass 3 is reduced by interposing heat insulative screens 27 between the cooling members 25 and these zones.

Finally, this cooling is also opposed by sending current through electrical heating resistors 28 contained in sheaths 29 immersed in the bath 2 along the longitudinal walls of the drawing tank.

It can be seen from FIGURES 1 and 2 that the apparatus further comprises electrical heating resistors 22' in sheaths 23' which are longer than the sheaths 23 and are likewise immersed in the bath 2. These resistors 22' are located under the edges of the layer of glass 3 a little in advance of the drawing point in order to bring these edges to a temperature near that of the center of the layer before being drawn.

The embodiment represented in FIGURE 5 shows a screen 19 carried by a cooling member 17 similar to the usual cooling members used for controlling the temperature of the two surfaces of the foot of the strip. It is of the same kind, for instance, as the cooling member 16 in FIGURE 1.

In FIGURE 6 an apparatus is shown in which the screen 19 forms the horizontal arm of an L-shaped component 30.

In the apparatus in accordance with the invention in FIGURE 6 this arm is arranged in such a way as to permit a cooling of the foot 15 while preventing as much cooling as possible of the bath of molten material 2 directly in front of this foot.

Other cooling members 16' and 17' of known type are also shown in FIGURE 6, contained in the drawing chamber bounded by the L-shaped components 30 and 31 and inclined walls 32 and 33 which connect components 30 and 31 to stringers 34 between which the strip passes. The strip 11 is advanced upwardly into a vertical coffer 35 by rollers 36.

In FIGURE 7 it can be seen that between the screen 19 and the terminal surface 18 of the layer of glass 3, there is provided a steel cooling member 37 preferably of non-oxidizing steel independent of the screen 19. This cooling member performs a function similar to the cooling member 17, but more effectively, and fulfills the functions of the end 20 in FIGURES 1, 3, 5 and 6. At its lower portion the member 37 has a layer of heat-insulating material 38 covered with a polished sheet 39 in order to reduce heat exchange between cooling member 37 and the part of the bath 2 immediately beyond the foot 15 of the strip.

In the embodiment shown in FIGURE 8, a carbon plate 40 is kept immersed by the screen 19 and the cooling member 17 in the bath of molten material, preventing it from being oxidized. The upper surface of the plate 40 is kept at a level above that of the lower surface 42 of the layer of glass 3.

This plate 40 can be adjusted vertically by the position of the screen 19 which in turn is adjusted by the position of the cooling member 17. For this purpose a lever 43 makes it possible to pivot the screen 19 around the axis of pipes such as 44 through which a cooling liquid passes.

The sheet of glass 3 can also be restricted in its lateral expansion, so that it shall not contact and adhere to the longitudinal walls 26, by means of carbon plates 45 in FIGURE 9. These plates are kept immersed in the bath of molten material 2 by refractory blocks 46 on which the slabs 47 are supported, the angle of which can be adjusted by wedges 49.

The upper level 50 of the plates 45 is above the level of the lower surface 51 of the sheet of glass 3. Transverse cooling members 52 carrying at each end a heat-insulating sleeve 53 ensure the cooling of the upper layer of the sheet of glass 3.

The heat-insulating sleeves 53 prevent congealing of the molten material between the sheet of glass 3 and the refractory blocks 46.

I claim:

1. A method of continuously drawing a glass strip upward from a layer of glass in the plastic state floating on a supporting bath of molten material, comprising slidingly advancing said layer along the bath toward the zone whereat the strip is drawn, from one side only of this zone, cooling the terminal front surface of the layer through the entire depth of the layer to a degree of viscosity such that the sliding advancement of the layer along the supporting bath is halted adjacent to the drawing zone, and continuously drawing upward the glass strip such that said terminal front surface is drawn with the rest of the glass.

2. Apparatus for continuously drawing a glass strip upward, comprising a drawing tank containing a supporting bath of molten material denser than glass, a device for drawing upward between the opposite ends of said tank a glass strip from a layer of glass sliding on said bath towards a drawing zone from one only of said opposite ends of the tank and thereby leave uncovered the portion of the bath located downstream of the drawing zone, means above the bath for cooling the terminal front surface of said sliding glass layer to halt the flow of the glass layer adjacent the foot of the strip and enable said terminal front surface to be drawn upward with the rest of the foot and heat insulating means between said cooling means and the uncovered portion of the bath located downstream of said terminal front surface of the glass layer.

3. Apparatus as claimed in claim 2, comprising further sheaths in said bath extending in the direction of movement of the glass layer from the part of said bath under the foot of the drawn strip to a point beyond the wall of the drawing tank at the end opposite to that by which the glass layer penetrates into the drawing tank, and heating resistors in said sheaths disposed under the foot of said strip, said heating resistors being adjustable in positions parallel to the direction of movement of the glass layer.

4. Apparatus as claimed in claim 3, wherein the end wall of the drawing tank beyond which said sheaths extend is separated from said bath by a solidified portion of the same material as that of the bath.

5. Apparatus as claimed in claim 2, comprising a carbon plate at the end of the heat insulating means adjacent to the terminal front surface of the glass layer, said plate being immersed in the bath but having its upper surface above the level of the lower surface of the glass layer.

6. Apparatus as claimed in claim 5, comprising means for vertical adjustment of said carbon plate.

7. A method as claimed in claim 1 comprising directing the cooling only towards the glass layer whereby the bath downstream of said front terminal surface of the layer is substantially unaffected by the cooling.

8. A method as claimed in claim 1 further comprising heating the bath downstream of said front terminal surface of the layer from beneath said portion to prevent the part of the bath in contact with the foot of the strip from cooling to its fusion point and thereby prevent it from being entrained by the glass being drawn.

References Cited

UNITED STATES PATENTS

| | | | |
|---|---|---|---|
| 1,499,406 | 7/1924 | Rowley | 65—92 X |
| 2,911,759 | 11/1959 | Pilkington et al. | 65—65 |
| 3,218,143 | 11/1965 | DeLajarte | 65—65 |
| 3,223,503 | 12/1965 | Barradell-Smith et al. | 65—65 |
| 3,251,667 | 5/1966 | Touvay | 65—99 |
| 3,256,082 | 6/1966 | Ward | 65—348 X |

DONALL H. SYLVESTER, *Primary Examiner.*

A. D. KELLOGG, *Assistant Examiner.*